United States Patent [19]

Kemmner et al.

[11] 4,373,872

[45] Feb. 15, 1983

[54] NOISE DAMPING DEVICE

[75] Inventors: Ulrich Kemmner, Sachsenheim; Peter Ringwald, Rutesheim; Hans-Ulrich Mütschele; Rainer Schillinger, both of Stuttgart, all of Fed. Rep. of Germany

[73] Assignee: Robert Bosch GmbH, Stuttgart, Fed. Rep. of Germany

[21] Appl. No.: 163,119

[22] Filed: Jun. 26, 1980

[30] Foreign Application Priority Data

Aug. 22, 1979 [DE] Fed. Rep. of Germany ....... 2933912

[51] Int. Cl.$^3$ ......................... F04B 11/00; F16L 55/04

[52] U.S. Cl. .................................... 417/312; 417/540; 138/30

[58] Field of Search ............... 417/540, 542, 312, 313; 138/30

[56] References Cited

U.S. PATENT DOCUMENTS

| | | | |
|---|---|---|---|
| 1,774,095 | 8/1930 | Hajek | 138/30 X |
| 2,276,568 | 3/1942 | Erickson | 417/540 X |
| 2,876,859 | 3/1959 | Moore | 417/540 X |
| 3,509,916 | 5/1970 | Mercier | 138/30 |
| 3,853,147 | 12/1974 | Cibulka | 138/30 |
| 3,868,972 | 3/1975 | Zirps | 138/30 |
| 4,205,637 | 6/1980 | Ito et al. | 138/30 |

*Primary Examiner*—Richard E. Gluck
*Attorney, Agent, or Firm*—Edwin E. Greigg

[57] ABSTRACT

A noise damping device is proposed for reducing and smoothing pressure fluctuations in a damping medium, especially in fuel supplied by fuel supply pumps, which serves to reduce pressure fluctuations downstream of the fuel supply pump. The noise damping device includes a diaphragm fluctuation damper which is disposed directly downstream of the pump compression collar and by means of which, by rotating the diaphragm fluctuation damper, an annular fitting is fixable in its axial position between the diaphragm fluctuation damper and the pump compression collar. A check valve in the connection extension of the diaphragm fluctuation damper or in the annular fitting prevents the return flow of fuel out of the fuel circulatory system after the termination of fuel supply.

7 Claims, 3 Drawing Figures

NOISE DAMPING DEVICE

BACKGROUND OF THE INVENTION

The invention relates to a noise damping device of the general type described by the preamble to the main claim. It has already been proposed to dispose a diaphragm inside the housing of a fuel supply pump for the purpose of noise damping, with this diaphragm temporarily yielding in the case of pressure fluctuations and thereby effecting damping. A device of this kind, however, is no longer freely accessible after being mounted, so that if there is later damage, it may be necessary to open the supply pump rather violently for repair purposes. The occurrence of pressure fluctuations and thus noise buildup, in the case of fluid supplied by means of a fluid pump, is caused by the fact that this pump is embodied as a positive-displacement pump. Such pumps aspirate the medium to be supplied, compress it and expel it once again, with this procedure being cyclically repeated in rapid succession. In the case of a roller piston pump, which is frequently used as a positive-displacement pump for supplying fuel, the aspiration, compression and expulsion of the medium recurs as frequently per pump rotation as there are discrete chamber volumes available; that is, in a five-celled roller piston pump, it recurs five times per pump rotation. Each of these pumping procedures is associated with a brief drop in the suction underpressure and an increase in the supply pressure, the frequency of the pressure fluctuations thus occurring being determined by the pump rpm. Thus in various motor vehicles (if the fluid pumps to be damped are fuel supply pumps) the result can sometimes be an annoying buildup of noise in the passenger area of the vehicle. These noises are caused by the pressure fluctuations in the fuel supply system (which in turn are caused by the mode of operation of the pump system, as described above) as they travel through the lines and the chassis of the vehicle and spread out as sound waves in the air. A reduction of such pressure fluctuations at their source is hardly possible. Accordingly, the present invention is directed to reducing or entirely eliminating disturbing noises.

OBJECT AND SUMMARY OF THE INVENTION

The noise damping device according to the invention intended for pressure fluctuations in a supply medium and having the characteristics of the main claim has the advantage over the prior art that direct interventions into the pumping area are not necessary; also, it is already possible to effect noise damping immediately adjacent to the pumping area, while it is simultaneously possible to secure an annular stub by means of the damping unit.

By means of the features described in the dependent claims, advantageous further embodiments of and improvements to the noise damping device disclosed in the main claim are possible. It is particularly advantageous that a noise damping device of this kind can be disposed in the course of the fuel circulatory system and thus embodies elements thereof; if the structure is compact, this can be done by integrating required connection and control elements therewith.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
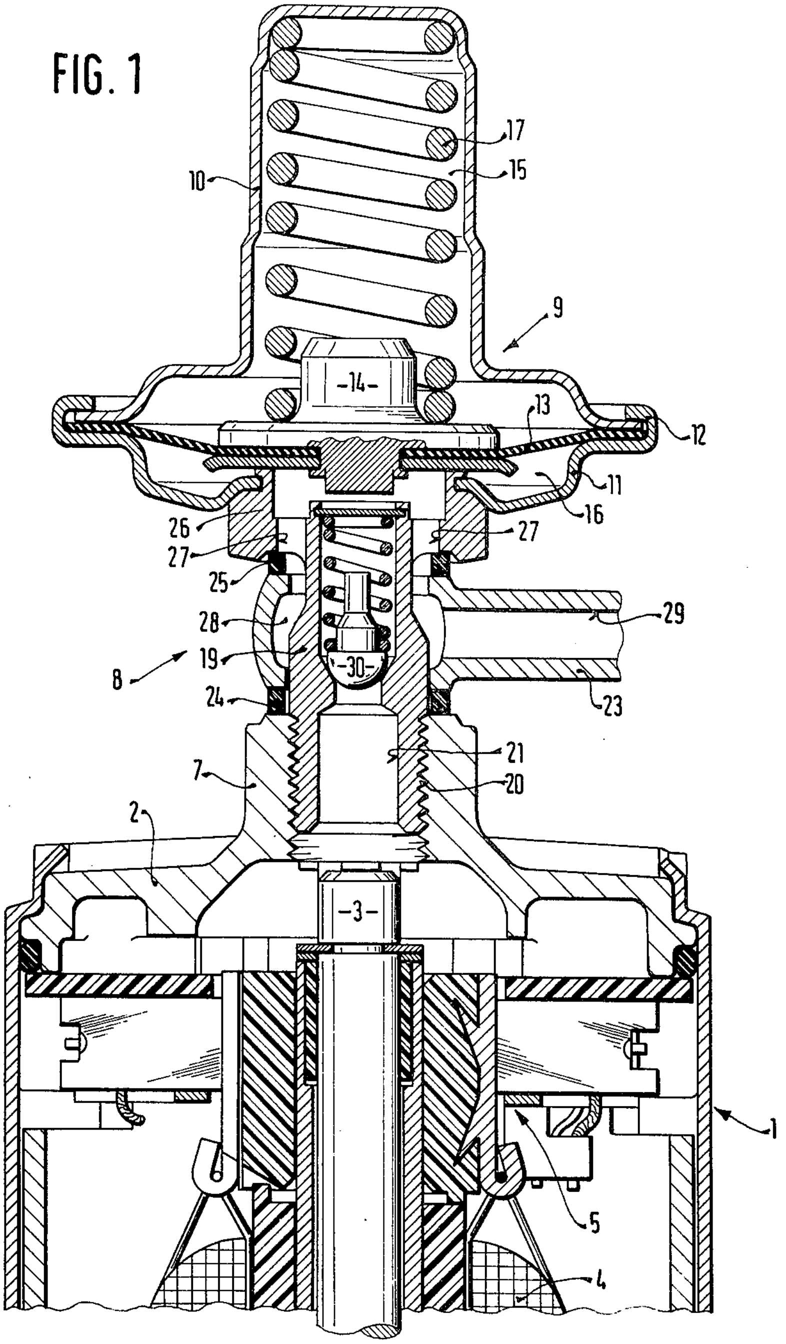
FIG. 1 is a partial detail, in cross section, of a pump cap having a noise damping device on the compression side.
Figure 3:
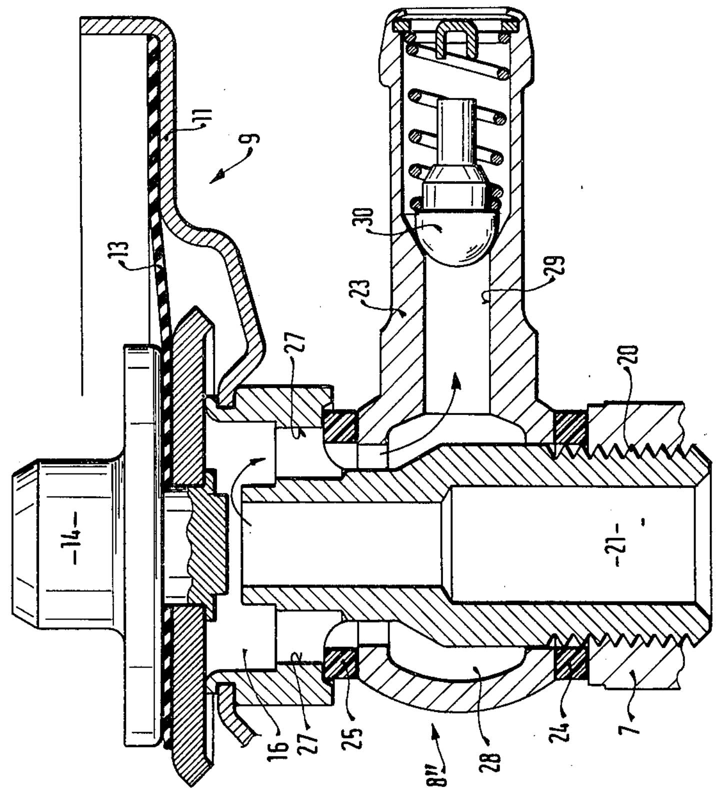
FIGS. 2 and 3 are each a further embodiment of a noise damping device.

The invention will be explained below in terms of a fuel supply pump; however, the use of the noise damping device according to the invention is not exclusively restricted to this type of pump. In the exemplary embodiment shown in FIG. 1, only those parts of the fuel pump 1 are shown in detail which are necessary to the understanding of the invention, for the basic structure and operating principle of pumps which cause pressure or suction fluctuations in the medium which they supply is known per se; generally, these are piston pumps or similar types. FIG. 1 shows the outlet area of a fuel supply pump of this kind, comprising a pump cap 2. The pump cap 2 supports at 3 a fixed shaft on which the armature 4, visible only in part, of the electromotor driving the actual rotating pump parts, not shown, is disposed. The collector of the electromotor, with carbon brushes sliding thereon, is shown at 5. A pump pressure collar 7 is connected to the pump cap 2 and immediately downstream thereof in the fuel circulatory system is a noise damping device 8. The noise damping device 8 should smooth and reduce pressure fluctuations in the supply medium as close as possible to their source, so that disturbing noises are reduced or even prevented entirely. This purpose is advantageously served by a diaphragm fluctuation damper 9, which has a damper housing made up of housing portions 10 and 11, these portions being crimped at 12 on their outer circumference, and a sealing element can be included at 12 if desired. The diaphragm fluctuation damper 9 is subdivided transversely by an elastic diaphragm 13, which is also held on its outer circumference by means of the crimping 12 and is provided at its center with a spring plate 14. The diaphragm 13 divides the housing 10, 11 of the diaphragm fluctuation damper 9 into a spring chamber 15 and a damping chamber 16. In the preferably air-filled spring chamber 15, there is a compression spring 17, which is supported at one end on the housing part 10 and on the other end on the spring plate 14 and this tends to deflect the diaphragm 13 into the damping chamber 16. Connected to the housing part 11 of the diaphragm fluctuation damper 9, by press-fitting or welding, for example, is a connection extension 19. The connection extension 19 is provided on its end remote from the diaphragm 13 with an outer thread 20 and is screwed thereby into the pump compression collar 7. A passageway 21 is provided in the connection extension 19 by way of which the fuel being supplied can proceed from the pump compression side into the damping chamber 16. The connection extension 19, embodied as a hollow screw, simultaneously guides an annular fitting 23, which with sealing rings 24 and 25 each being interposed is fixed in its axial position between the diaphragm fluctuation damper 9 and the pump compression collar 7 by rotating the diaphragm fluctuation damper 9. Preferably parallel to the passageway 21, at least one channel 27 is provided in an extended region 26 of the connection extension 19. This channel 27 connects the damping chamber 16 with an annular groove 28, which is formed between one portion of the outer circumference of the connection extension 19 and the annular fitting 23. The fuel flows out of the annular groove 28 and continues into the fuel circulatory system by way of a flow channel 29.

Particularly good damping is effected by means of a compression spring 17 which is as long and yielding as possible. The adjustment of the damping function area can be attained by axial deformation of housing parts 10, 11.

In order to prevent fuel from flowing back out of the fuel circulatory system when the fuel supply pump 1 is not operating, and to prevent the pressure in the fuel circulatory system from dropping at such a time, a check valve 30 is disposed in the connection extension 19 of the diaphragm fluctuation damper 9. The check valve 30 opens the passageway 21 in the flow direction from the pump compression side to the damping chamber and closes it in the opposite direction.

Figure 2:
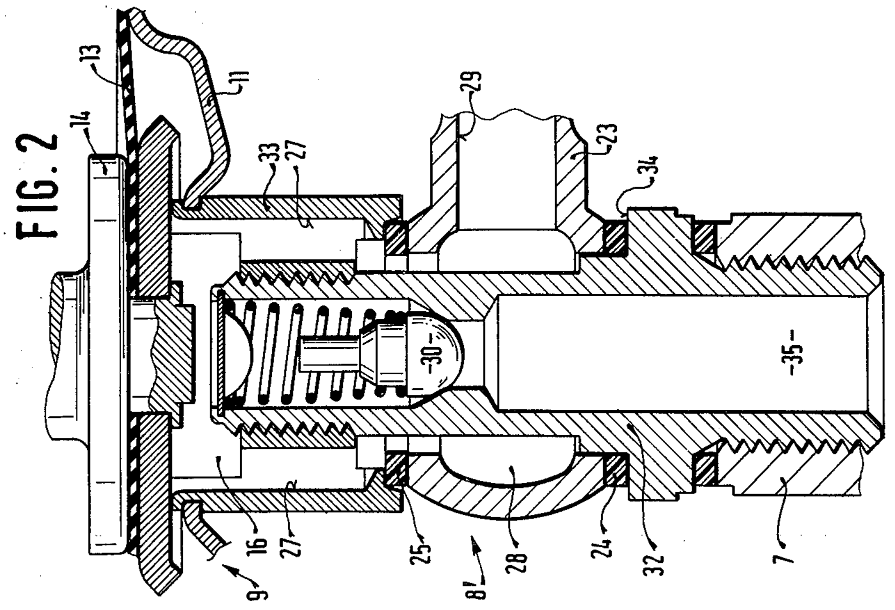

In the second exemplary embodiment shown in FIG. 2, the elements which are the same as in the first embodiment are given identical reference numerals. A noise damping device 8′ is disposed immediately adjacent to the pump compression collar 7. To this end, a screw 32 is screwed into the pump compression collar 7 and on its other end the diaphragm fluctuation damper 9 is screwed with a connection element 33. The annular means 23 is guided on this screw sleeve 32. The annular fitting 23, with sealing rings 24, 25 each being interposed, is fixed in its axial position between the diaphragm fluctuation damper 9 and a shoulder 34 by rotating the diaphragm fluctuation damper 9. A passageway 35 in the screw sleeve 32 connects the pump compression side with the damping chamber 16, from whence the fuel can flow via at least one channel 27 in the connection element 33 to an annular groove 28, which is formed between one part of the outer circumference of the screw sleeve 32 and the annular fitting 23. The check valve 30 is disposed, in this exemplary embodiment, in the screw sleeve 32 and opens the passageway 35 in the flow direction from the pump compression side to the damping chamber 16.

The third exemplary embodiment of a noise damping device 8″ differs from the first embodiment shown in FIG. 1 solely in that the check valve 30 is disposed in the ring support 23—that is, downstream of the damping chamber 16—and opens in the flow direction from the damping chamber 16 toward the fuel circuit. As a result of this disposition of the check valve 30 in the annular fitting 23, there is the advantage that after the shutoff of the fuel supply pump 1 the fuel still located in the damping chamber 16 is not expelled through the diaphragm 13 into the fuel circuit, which could cause difficulties in starting the next time an attempt is made to start the engine.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A noise damping device, which is disposed in a pressurized fluid supply system intermediate an outlet of a fluid supply pump and a pressure line and which is threadingly connected at the pump outlet with an internally threaded compression collar of the pump, for smoothing and reducing pressure fluctuations occuring in the pump, the noise damping device having an axis and comprising:

a diaphragm fluctuation damper including a damper housing and a diaphragm which is disposed within the damper housing and which defines, together with the damper housing, a damping chamber;

a connection extension for connecting the diaphragm fluctuation damper to the pump, having an externally threaded first end which is screwed into the internally threaded pump compression collar and having an opposite second end, the connection extension defining an axial passageway extending between its first and second ends and connecting the pump outlet to the damping chamber;

an annular fitting having an annular-shaped first end through which the connection extension extends and a second end connected to the pressure line, the fitting defining an inner annular groove extending about the connection extension and a flow channel extending from the annular groove to the pressure line;

first and second sealing rings, which extend about the connection extension and which are disposed on one side of the fitting annular-shaped first end facing the damper housing and on an opposite side of the fitting annular-shaped first end facing the pump compression collar respectively; and a second passageway, which is defined by the connection extension, the fitting annular-shaped first end, the first sealing ring, and the damper housing, and which extends between the damping chamber and the annular groove;

the damper housing being connected to the second end of the connection extension such that rotation of the damper housing about the device axis produces an axial displacement of the damper housing relative to the pump outlet, whereby the annular fitting is fixed in an axial position between the first and second sealing rings by twisting the damper housing in one direction of rotation.

2. A noise damping device, as described in claim 1, wherein the second end of the connection extension is integrally connected with the damper housing.

3. A noise damping device, as described in claim 1, wherein:

the second end of the connection extension includes an external screw thread; and the damper housing includes an internally threaded axial opening into which the externally threaded connection extension is screwed to connect the damper housing to the connection extension.

4. A noise damping device, as described in claim 3, wherein:

the connection extension includes an annular outer shoulder disposed intermediate the annular fitting and the pump compression collar;

the second sealing ring is disposed between the damper housing and one side of the connection extension shoulder; and the noise damping device further includes a third sealing ring extending about the connection extension between the pump compression collar and an opposite side of the connection extension shoulder.

5. A noise damping device, as described in claim 1, which further comprises a check valve disposed in the connection extension passageway and opening in the direction of the damping chamber.

6. A noise damping device, as described in claim 1, which further comprises a check valve disposed in the annular fitting flow channel and opening in the direction of the pressure line.

7. A noise damping device, which is disposed in a pressurized fluid supply system intermediate an outlet of a fluid supply pump and a pressure line, for smoothing and reducing pressure fluctuations occurring in the pump, the noise damping device having an axis and including:

a connection extension having a first end connected to the pump outlet, an externally threaded second end, and an outer annular shoulder intermediate the first and second ends, the connection extension defining an axial passageway therethrough between its first and second ends;

a diaphragm fluctuation damper including a damper housing and a diaphragm which is disposed within the damper housing and which defines, together with the damper housing, a damping chamber, the damper housing including an internally threaded axial opening to the damping chamber for receiving and threadingly engaging the externally threaded second end of the connection extension, wherein the damping chamber is connected to the pump outlet by the connection extension passageway;

an annular fitting having an annular-shaped first end through which the connection extension extends and a second end connected to the pressure line, the fitting defining an inner annular groove extending about the connection extension and a flow channel extending from the annular groove to the pressure line;

a first sealing ring extending about the connection extension between the annular fitting and the damper housing;

a second sealing ring extending about the connection extension between the annular fitting and the connection extension shoulder; and a second passageway, which is defined by the connection extension, the annular fitting, the first sealing ring, and the damper housing, for connecting the damping chamber to the annular groove;

wherein the annular fitting is fixed in an axial position between the diaphragm fluctuation damper and the connection extension shoulder, with the interposition of the first and second sealing rings, by rotating the diaphragm fluctuation damper in one direction about the device axis.

* * * * *